(12) United States Patent
Akiyama et al.

(10) Patent No.: US 11,934,009 B2
(45) Date of Patent: Mar. 19, 2024

(54) REINFORCING SLEEVE, REINFORCING STRUCTURE OF SPLICED PORTION OF OPTICAL FIBER

(71) Applicant: FURUKAWA ELECTRIC CO., LTD., Tokyo (JP)

(72) Inventors: Tomohiro Akiyama, Tokyo (JP); Ryuji Takaoka, Tokyo (JP); Akio Tanabe, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/578,529

(22) Filed: Jan. 19, 2022

(65) Prior Publication Data

US 2022/0229236 A1 Jul. 21, 2022

(30) Foreign Application Priority Data

Jan. 19, 2021 (JP) ................... 2021-006564

(51) Int. Cl.
*G02B 6/255* (2006.01)
(52) U.S. Cl.
CPC ......... *G02B 6/2551* (2013.01); *G02B 6/2552* (2013.01); *G02B 6/2558* (2013.01)
(58) Field of Classification Search
CPC .............................. G02B 6/2551; G02B 6/2558
See application file for complete search history.

(56) References Cited

U.S. PATENT DOCUMENTS 11,644,622 B2 * 5/2023 Akiyama ............. G02B 6/4408
385/99

FOREIGN PATENT DOCUMENTS

| JP | 64-32208 A | | 2/1989 | |
|---|---|---|---|---|
| JP | H09197172 A | * | 7/1997 | |
| WO | WO-2014002558 A1 | * | 1/2014 | ........... G02B 6/2558 |

* cited by examiner

*Primary Examiner* — Omar R Rojas
(74) *Attorney, Agent, or Firm* — Oblon, McClelland, Maier & Neustadt, L.L.P.

(57) ABSTRACT

A reinforcing sleeve for collectively reinforcing spliced portions of a plurality of optical fiber core wires disposed side by side includes a heat-shrinkable tube, a heat-meltable member, a tension member, and so on. The tension member and the heat-meltable member are inserted into the heat-shrinkable member. A thick portion is provided at a substantially center portion of a width direction of the heat-meltable member. Thus, on a cross section perpendicular to a longitudinal direction of the heat-meltable member, an amount of the heat-meltable member at proximity of the center portion of the width direction of the heat-meltable member is greater than an amount of the heat-meltable member at proximity of the end portions of the width direction of the heat-meltable member. This forms a flow of the heat-meltable member from the center portion toward the end portions in the width direction at the time of melting the heat-meltable member.

7 Claims, 14 Drawing Sheets

PRIOR ART

PRIOR ART

PRIOR ART

REINFORCING SLEEVE, REINFORCING STRUCTURE OF SPLICED PORTION OF OPTICAL FIBER

TECHNICAL FIELD

The present invention relates to a reinforcing sleeve, and a reinforcing structure of a spliced portion of an optical fiber using the reinforcing sleeve.

BACKGROUND

It is known that a reinforcing sleeve is provided at a fusion spliced portion for reinforcing when fusion splicing optical fiber core wires with each other, for example.

Various types of such reinforcing sleeves have been devised. For example, Patent Document 1 discloses a reinforcing sleeve in which a hot melt adhesive tube and a tension member are inserted into a heat-shrinkable tube.

RELATED ART

Patent Document 1: Japanese Unexamined Patent Application Publication No. 1989-32208 (JP-A-1989-32208)

SUMMARY

Problems to be Solved by the Invention

An optical fiber tape core wire has been used in recent years as an optical fiber for carrying mass quantity of data at high speed. The optical fiber tape core wire includes a plurality of optical fiber core wires that are placed side by side and bonded with each other, and is used to facilitate packaging inside a cable and to simplify operations. In addition to the optical fiber tape core wire including the plurality of optical fiber core wires that are disposed side by side and fixed and bonded over an entire length by resin, an optical fiber ribbon including the plurality of side-by-side optical fiber core wires bonded with each other at intervals in a longitudinal direction has also been used. Such intermittent bonding between optical fiber core wires improves fiber density, reduces transmission loss due to bending, and facilitates making a single core fiber. Hereinafter, the optical fiber tape core wire and the optical fiber ribbon will be collectively referred to as an optical fiber tape for simplification.

FIG. 10A to FIG. 10C show steps for reinforcing a spliced portion of optical fiber tapes using a reinforcing sleeve. First, as shown in FIG. 10A, optical fiber core wires 101 that are disposed facing each other are butted to each other and fusion bonded with each other by discharging electricity from an electrode 103. At this time, a reinforcing sleeve 100 is put aside on a side of one of the optical fiber core wires 101.

Next, as shown in FIG. 10B, the reinforcing sleeve 100 is moved to the spliced portion of the optical fiber core wires 101 (an arrow F in the drawing). Then, as shown in FIG. 10C, the reinforcing sleeve 100 is heated and shrunk so that the reinforcing sleeve 100 and a plurality of the optical fiber core wires 101 are unified as one body, thereby reinforcing the spliced portion of the plurality of optical fiber core wires 101.

FIG. 11A is a cross-sectional view of a state shown in FIG. 10B. As mentioned above, the reinforcing sleeve 100 includes a heat-meltable member 107 and a tension member 109 that are inserted into a heat-shrinkable tube 105. The heat-meltable member 107 is in a cylindrical shape, and the spliced portion of the side-by-side optical fiber core wires 101 is provided so as to pass through the heat-meltable member 107. Outer jackets of the optical fiber core wires 101 that are to be passed through the heat-meltable member 107 are removed before splicing.

FIG. 11B is an ideal schematic view of a structure of the reinforcing sleeve 100 when heated. The heat-shrinkable tube 105 shrinks by heating. Also, the heat-meltable member 107 softens by heat, filling up space inside the heat-shrinkable tube 105 after shrinking, and becomes unified with the plurality of optical fiber core wires 101 and the tension member 109.

Here, an upper surface of the tension member 109 (on a side of the optical fiber core wires 101) is often formed as a plane. It is expected for the plurality of optical fiber core wires 101 to align with the plane of the upper surface of the tension member 109, and to be unified with the tension member 109 and the heat-meltable member 107.

However, in reality, as shown in FIG. 11C, when the heat-shrinkable tube 105 shrinks, the heat-meltable member 107 receives force from its surroundings (arrows G in the drawing), and thus the plurality of optical fiber core wires 101 receive side pressure. As mentioned above, although the optical fiber core wires 101 are expected to align straightly with the plane portion of the upper surface of the tension member 109, the side pressure, particularly in a width direction, disarranges the optical fiber core wires 101. For example, part of the optical fiber core wires 101 move away from the tension member 109 to be gathered around the center.

Such tendency is more noticeable in particular as a distance between the optical fiber core wires 101 (a pitch) decreases or the number of the optical fiber core wires 101 increases. This tendency is also more noticeable when a diameter of an optical fiber bare wire is small, with less rigidity. Also, this tendency is further noticeable in an intermittently-bonded optical fiber ribbon, in which the plurality of optical fiber core wires are bonded at intervals in a longitudinal direction.

If the alignment of the optical fiber core wires 101 is disarranged as above, transmission loss in part of the optical fiber core wires 101 may increase. For this reason, when shrinking the heat-shrinkable tube 105, the optical fiber core wires 101 are expected to be always unified in a fixed form, without disarrangement of the alignment of each of the optical fiber core wires 101.

The present invention was made in response to the above issue, and it is an object of the present invention to provide a reinforcing sleeve and the like that can efficiently reinforce a spliced portion of optical fiber tapes.

Means for Solving Problems

To achieve the above object, a first aspect of the present invention is a reinforcing sleeve for collectively reinforcing spliced portions of a plurality of optical fiber core wires that are disposed side by side. The reinforcing sleeve includes a heat-shrinkable tube, a tension member, and a heat-meltable member. The tension member and the heat-meltable member are inserted into the heat shrinkable tube. The heat-meltable member includes a convex portion protruding toward an inner surface side of the heat-meltable member. The convex portion is formed on a side of the tension member at proximity of a center portion of a width direction in a cross section perpendicular to a longitudinal direction of the tube-shaped heat-meltable member.

According to the first aspect of the present invention, the convex portion protruding toward the inner surface side is formed on the side of the tension member at proximity of the center portion of the width direction of the tube-shaped heat meltable-member. Thus, the optical fiber core wires can be dispersed toward end portions along the convex portion. This can prevent disarrangement caused by side pressure.

A second aspect of the present invention is a reinforcing sleeve for collectively reinforcing spliced portions of a plurality of optical fiber core wires that are disposed side by side. The reinforcing sleeve includes a heat-shrinkable tube, a tension member, and a heat-meltable member. The tension member and the heat-meltable member are inserted into the heat shrinkable tube. The heat-meltable member includes a thick portion having a thickness that is greater than thicknesses of the other parts. The thick portion is formed at proximity of a center portion of a width direction in a cross section perpendicular to a longitudinal direction of the heat-meltable member.

The thick portion may be formed on a side of the tension member of the heat-meltable member, and an inner surface side of the heat-meltable member may be formed in a protruding shape protruding toward a center of the heat-meltable member.

According to the second aspect of the present invention, an amount of the heat-meltable member per unit circumference length at proximity of the center portion of the width direction of the heat-meltable member is greater than an amount of the heat-meltable member per unit circumference length at proximity of end portions of the width direction of the heat-meltable member. This forms a flow of the heat-meltable member from the center portion toward the end portions at the time of melting the heat-meltable member. Thus, the optical fiber core wires can be dispersed toward the end portions, and this can prevent disarrangement due to side pressure.

In addition, the thick portion is in the protruding shape protruding toward the inner surface side, and, when arranging the optical fiber core wires, this protruding shape facilitates dispersing the arrangement of the optical fiber core wires toward the end portion sides.

A third aspect of the present invention is a reinforcing sleeve for collectively reinforcing spliced portions of a plurality of optical fiber core wires that are disposed side by side. The reinforcing sleeve includes a heat-shrinkable tube, a tension member, and a heat-meltable member. The tension member and the heat-meltable member are inserted into the heat shrinkable tube. The heat-meltable member includes a first tube-shaped heat-meltable member, and a second heat-meltable member that is disposed at a center portion of a width direction of the first heat-meltable member.

The second heat-meltable member may be disposed between the first heat-meltable member and the tension member, and an outer shape of the second heat-meltable member may be formed in a protruding shape protruding toward the first heat-meltable member.

The third aspect of the present invention can provide the same effects as the second aspect of the present invention. Also, by disposing further the second heat-meltable member at the center portion of the width direction of the first heat-meltable member, a conventionally used heat-meltable member may be employed as the first heat-meltable member.

At this time, the second heat-meltable member is disposed between the first heat-meltable member and the tension member, and the outer shape of the second heat-meltable member is formed in the protruding shape protruding toward the first heat-meltable member. Thus, when arranging the optical fiber core wires, the protruding shape facilitates dispersing the arrangement of the optical fiber core wires toward the end portion sides.

A fourth aspect of the present invention is a reinforcing structure of a spliced portion of optical fibers using the reinforcing sleeve according to the first to third aspects of the present invention, in which the heat-meltable member unifies the spliced portion of optical fiber ribbons and the tension member as one body. The optical fiber ribbon includes a plurality of optical fiber core wires that are placed side by side and bonded to each other at intervals in a longitudinal direction.

Preferably, the number of the plurality of optical fiber core wires forming the optical fiber ribbon is 12 or more.

Preferably, a pitch between the plurality of optical fiber core wires is 200 μm or less.

Preferably, an outer diameter of a glass fiber of the optical fiber core wire is 110 μm or less.

Preferably, an outer diameter of the optical fiber core wire is 200 μm or less.

According to the fourth aspect of the present invention, the plurality of optical fiber core wires forming the optical fiber ribbon are dispersed by the flow of the heat-meltable member, and this can suppress a variation in transmission loss in each optical fiber core wire due to disarrangement of the optical fiber core wires.

The above effects are particularly remarkable when the number of the plurality of optical fiber core wires forming the optical fiber ribbon is 12 or more. Also, the above effects are remarkable when the pitch between the plurality of optical fiber core wires is 200 μm or less. Also, the above effects are remarkable when the outer diameter of the glass fiber of the optical fiber core wire is 110 μm or less. Also, the above effects are remarkable when the outer diameter of the optical fiber core wire is 200 μm or less.

Effects of the Invention

The present invention can provide a reinforcing sleeve and the like that can efficiently reinforce a spliced portion of optical fiber tapes.

BRIEF DESCRIPTION OF THE DRAWINGS

FIG. 4A is a cross-sectional view of a reinforcing sleeve 1a.

FIG. 4B is a cross-sectional view of a reinforcing sleeve 1b.

DETAILED DESCRIPTION

First Embodiment

Figure 1:
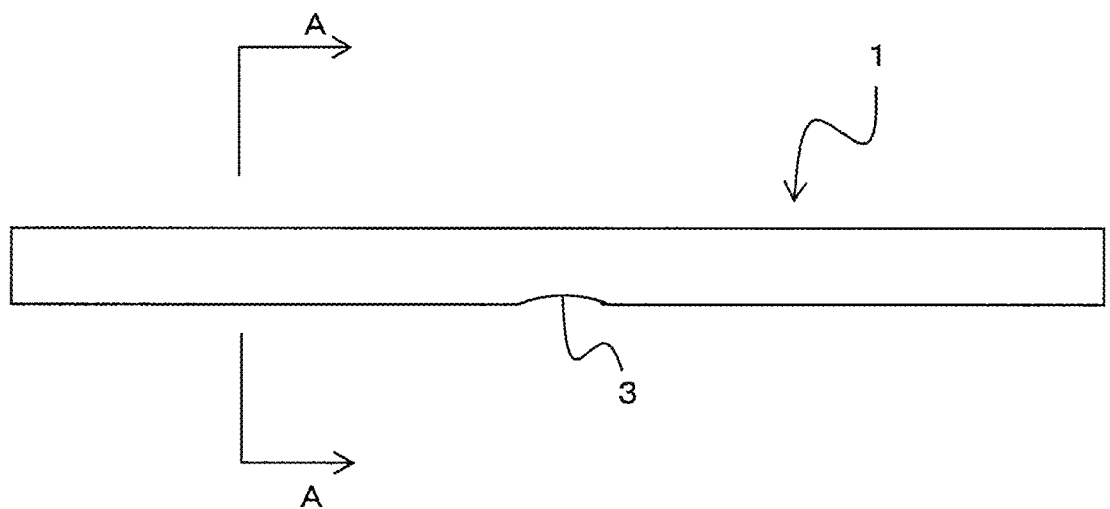
FIG. 1A is a side view showing a reinforcing sleeve 1.
FIG. 1B is a cross-sectional view taken along A-A line in FIG. 1A.
Figure 1:
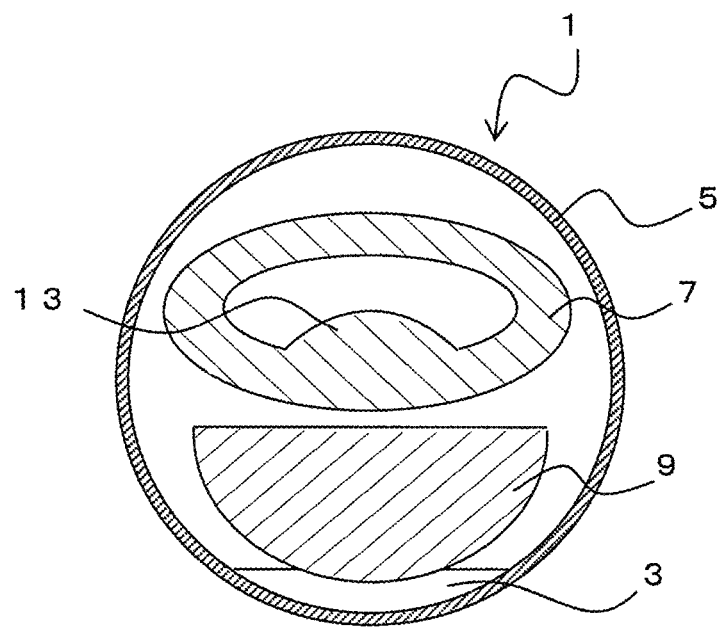

Hereinafter, preferable embodiments of the present invention will be described with reference to the accompanying drawings. FIG. 1A is a side view of a reinforcing sleeve 1, and FIG. 1B is a cross-sectional view taken along A-A line in FIG. 1A. The reinforcing sleeve 1 is a member that collectively reinforces spliced portions of a plurality of optical fiber core wires that are disposed side by side. The reinforcing sleeve 1 includes a heat-shrinkable tube 5, a heat-meltable member 7, a tension member 9, and so on.

The heat-shrinkable tube 5 is a cylindrical member having an approximately circular cross section. The heat-shrinkable tube 5 is made of polyethylene resin, for example.

The heat-meltable member 7 is in a cylindrical shape having an approximately circular or elliptical cross section. The heat-meltable member 7 is made of ethylene-vinyl acetate resin, for example. The heat-meltable member 7 melts preferably at a temperature lower than a heat-shrinking temperature of the heat-shrinkable tube 5. A thick portion 13 having a thickness that is greater than thicknesses of other parts is provided at proximity of a center portion of a width direction of the heat-meltable member 7. The thick portion 13 is formed on a lower part of the heat-meltable member 7 (on a side of the tension member 9). Also, the thick portion 13 is formed so that an inner surface side of the heat-meltable member 7 is in a shape protruding toward a center of the heat-meltable member 7.

The tension member 9 is a rod-shaped member. The tension member 9 is made of steel, carbon, glass, or ceramics, for example. The tension member 9 and the heat-meltable member 7 are inserted into the heat-shrinkable tube 5. A rivet-head portion 3 is formed at a part of the heat-shrinkable tube 5 to prevent the tension member 9 and the heat-meltable member 7 from falling.

If the tension member 9 inclines in the cross section, the tension member 9 may shift in relation to a position of the heat-shrinkable tube 5 and this may cause the tension member 9 to lose its balance. In such a case, non-uniform force presses the optical fiber core wires against the tension member 9, which may deteriorate an alignment of the optical fiber core wires. The rivet-head 3, however, prevents the inclination of the tension member 9 and is effective in maintaining the arrangement of the tension member 9 and the optical fiber core wires.

Figure 2:
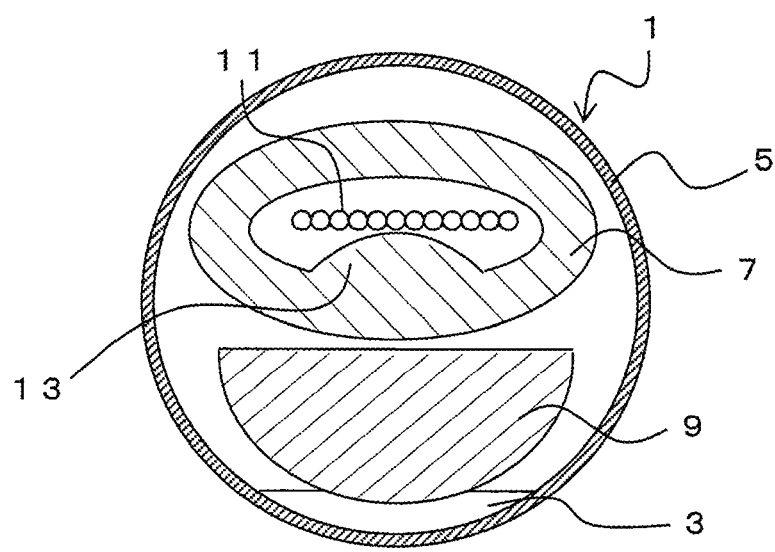
FIG. 2A is a view showing a reinforcing step for a spliced portion between optical fiber core wires 11 using the reinforcing sleeve 1, and is a cross-sectional view before shrinking.
FIG. 2B is a view showing the reinforcing step for the spliced portion between the optical fiber core wires 11 using the reinforcing sleeve 1, and is a cross-sectional view in the course of shrinking.
FIG. 2C is a view showing the reinforcing step for the spliced portion between the optical fiber core wires 11 using the reinforcing sleeve 1, and is a cross-sectional view after shrinking.
Figure 2:
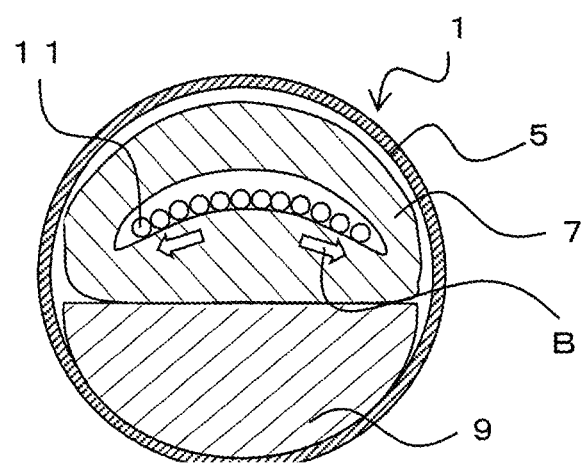
Figure 2:
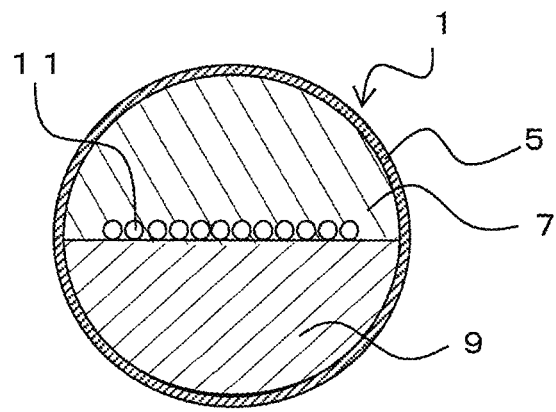
Figure 10:
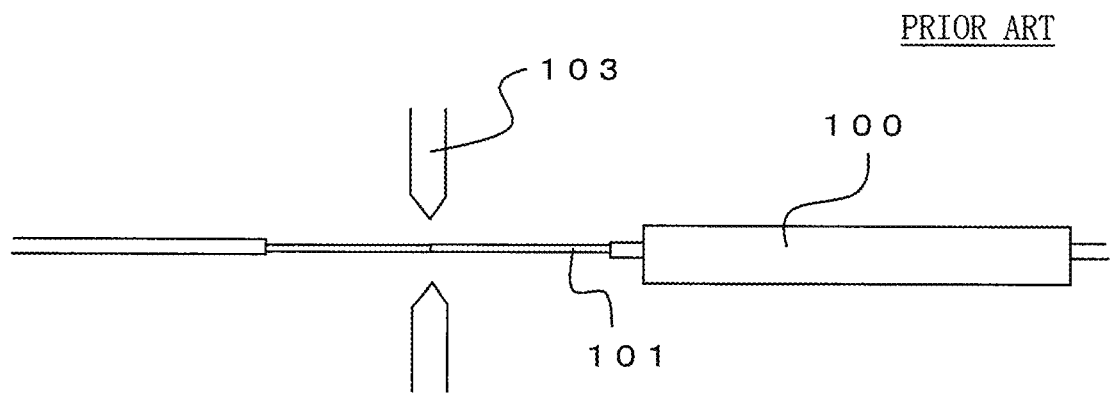
FIG. 10A is a view showing a splicing step of optical fiber core wires 101 using a traditional reinforcing sleeve 100.
FIG. 10B is a view showing the splicing step of the optical fiber core wires 101 using the traditional reinforcing sleeve 100.
FIG. 10C is a view showing the splicing step of the optical fiber core wires 101 using the traditional reinforcing sleeve 100.
Figure 10:
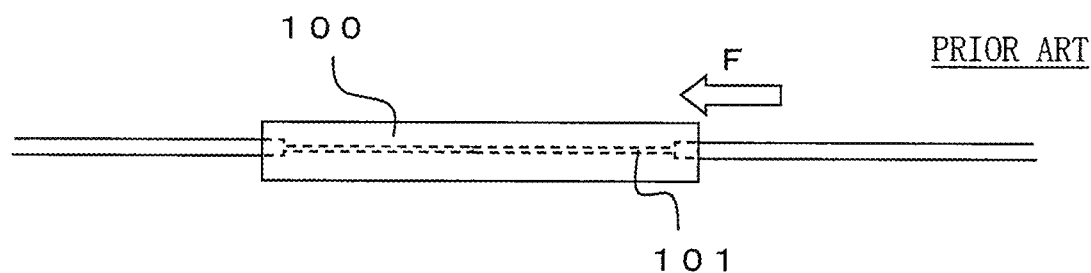
Figure 10:
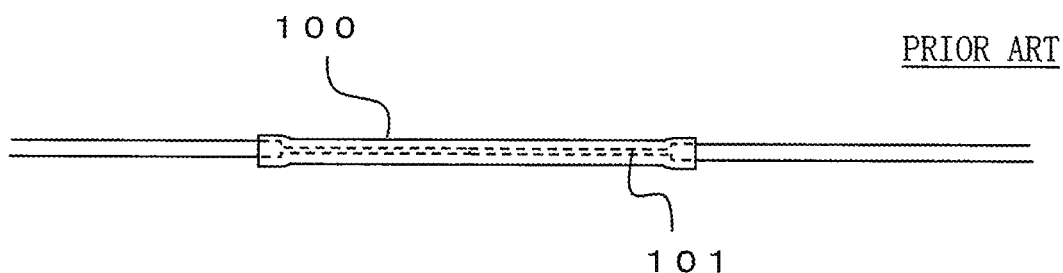
Figure 11:
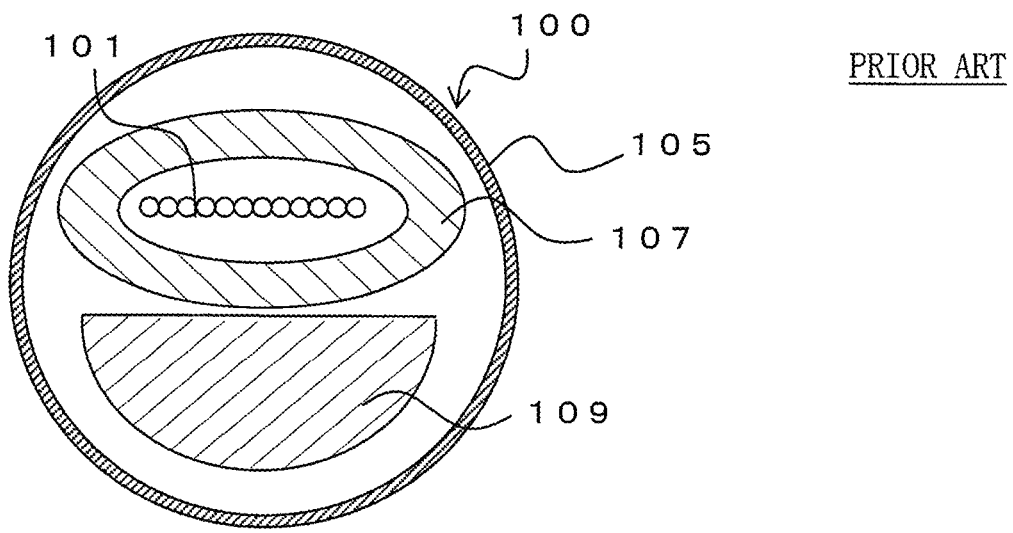
FIG. 11A is a view showing the reinforcing step for a spliced portion between the optical fiber core wires 101 using the traditional reinforcing sleeve 100, and is a cross-sectional view before shrinking.
FIG. 11B is a view showing the reinforcing step for the spliced portion between the optical fiber core wires 101 using the traditional reinforcing sleeve 100, and is an ideal cross-sectional schematic view after shrinking.
FIG. 11C is a view showing the reinforcing step for the spliced portion between the optical fiber core wires 101 using the traditional reinforcing sleeve 100, and is an actual cross-sectional schematic view after shrinking.
Figure 11:
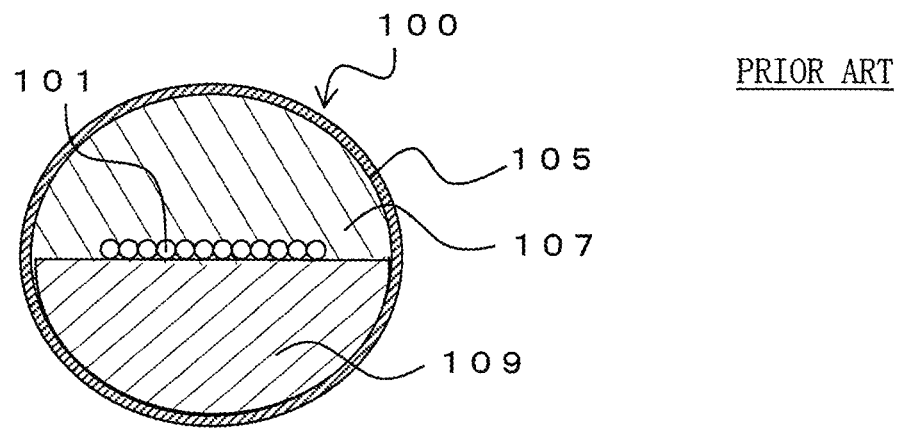
Figure 11:
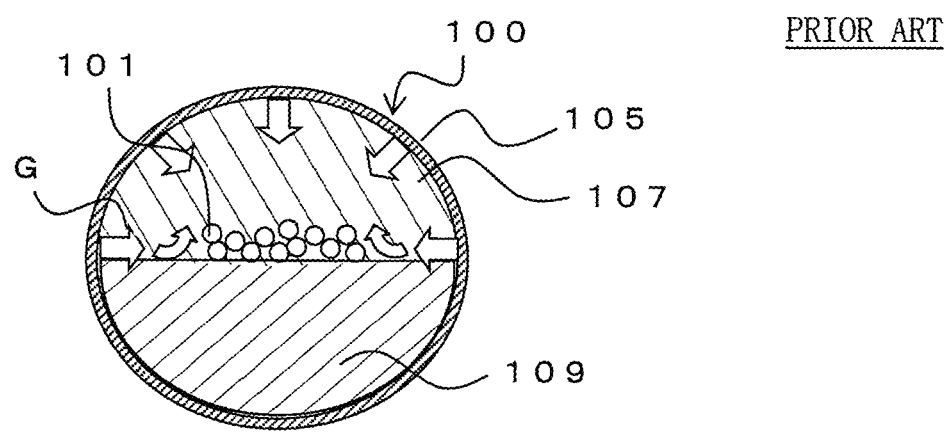

Next, a reinforcing method for an optical fiber spliced portion using the reinforcing sleeve 1 will be described. FIG. 2A to FIG. 2C are views illustrating reinforcing steps for the spliced portion between optical fiber core wires 11 forming an optical fiber tape. First, similarly to the above-mentioned FIG. 10A to FIG. 10C, outer jackets of end portions of the optical fiber core wires 11 are removed for a predetermined length, and then the end portions are butted together and fusion bonded to each other. At this time, a plurality of the optical fiber core wires 11 on one side of the optical fiber core wires are inserted into the heat-meltable member 7 of the reinforcing sleeve 1, and the reinforcing sleeve 1 is put aside on the one side of the optical fiber core wires.

Next, as shown in FIG. 2A, the reinforcing sleeve 1 is moved so as to cover the spliced portion of the plurality of optical fiber core wires 11. At this time, the optical fiber core wires 11 are disposed along the protruding shape of the thick portion 13, and this facilitates dispersion of the optical fiber core wires 11 in the width direction. Then, the heat-shrinkable tube 5 and the heat-meltable member 7 are heated to shrink the heat-shrinkable tube 5 and melt the heat-meltable member 7.

FIG. 2B is a cross-sectional view showing a state in which the heat-shrinkable tube 5 starts shrinking and the heat-meltable member 7 starts melting. As mentioned above, the thick portion 13 is formed at the substantially center portion of the width direction of the heat-meltable member 7. Thus, in a cross section perpendicular to the longitudinal direction of the heat-meltable member 7, an amount of the heat-meltable member at proximity of the center portion of the width direction of the heat-meltable member 7 is greater than an amount of the heat-meltable member at proximity of the end portions of the width direction of the heat-meltable member 7. Thus, when the heat-meltable member 7 melts, the heat-meltable member 7 flows from the proximity of the center portion of the width direction toward the end portion sides (arrows B in the drawing).

FIG. 2C is a cross-sectional view showing a state in which the heat-shrinkable tube 5 is completely shrunken. As mentioned above, the heat-meltable member 7 applies side pressure to the optical fiber core wires 11 when the heat-shrinkable tube 5 shrinks. However, when melting the heat-meltable member 7, the optical fiber core wires 11 disperse toward the end portion sides of the width direction. For this reason, force applied by the flow of the heat-meltable member 7 pushing the optical fiber core wires 11 toward the end portion sides of the width direction counteracts the side pressure applied to each of the optical fiber core wires 11. This can suppress floating of the optical fiber core wires 11 from the tension member 9 and prevent disarrangement. In reality, the optical fiber core wires 11 are not in contact with the tension member 9, and the heat-meltable member 7 enters into a space between the optical fiber core wires 11 and the tension member 9.

When the heat-meltable member 7 is completely melted and the heat-shrinkable tube 5 is completely shrunken, the heating is stopped to cool, and then the heat-meltable member 7 unifies the tension member 9 with the spliced portion of the optical fiber core wires 11 as one body. In this way, a reinforcing structure of the spliced portion of the optical fibers using the reinforcing sleeve 1 can be obtained. That is, in the reinforcing structure of the spliced portion of the optical fibers, the heat-meltable member 7 covers the spliced portion of the optical fiber core wires 11, and the optical fiber core wires 11 forming the optical fiber tape are disposed along a surface of the tension member 9.

If the optical fiber tape is an optical fiber ribbon, in particular, in which a plurality of optical fiber core wires are bonded at intervals in a longitudinal direction and adjacent bonded portions are arranged in a zigzag arrangement or in a step form in the longitudinal direction, for example, the arrangement of the optical fiber core wires 11 is likely to be disarranged due to the side pressure.

Figure 3:
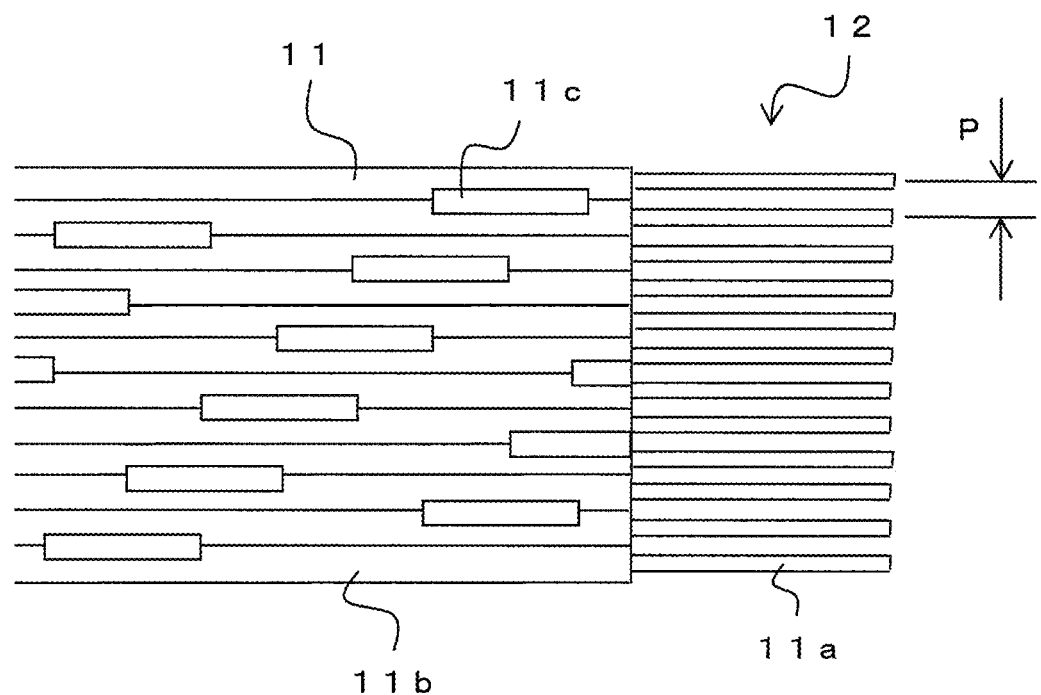
FIG. 3A is a view showing an optical fiber ribbon 12.
FIG. 3B is a view showing a state in which the optical fiber ribbons 12 are butted to each other.
Figure 3:
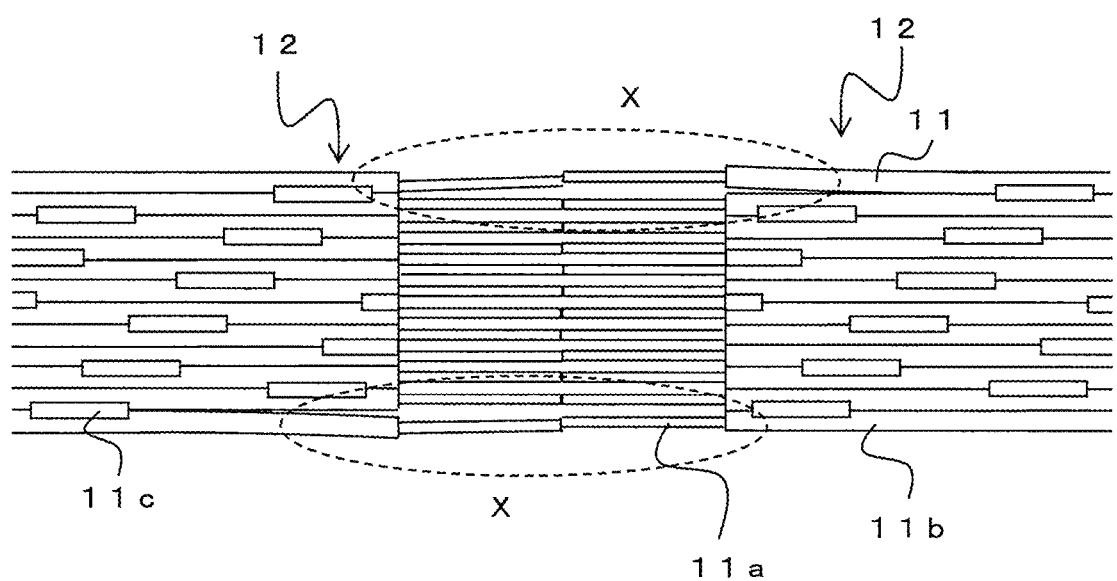

FIG. 3A is a view showing an optical fiber ribbon 12. As mentioned above, the optical fiber ribbon 12 includes the plurality of optical fiber core wires 11 that are arranged side by side and bonded at intervals in the longitudinal direction at bonding portions 11c. The optical fiber core wire 11 includes a glass fiber 11a inside and a resin coating 11b that is disposed on an outer periphery of the glass fiber 11a. The resin coating 11b at an end portion of the optical fiber core wire 11 is removed when splicing the optical fiber core wires 11. Here, a pitch P between the optical fiber core wires 11 is almost equal to an outer diameter of the optical fiber core wire 11.

FIG. 3B is a schematic view showing a state in which the optical fiber ribbons 12 are butted and fusion bonded with each other. The optical fiber ribbon 12 has intermittent bonding portions for fixing the optical fiber core wires 11 with each other. Thus, the optical fiber ribbon 12 has longer independent parts of the optical fiber wires 11 than a traditional optical fiber tape, in which the optical fiber core wires 11 are fixed over an entire length thereof. For this reason, the arrangement of the optical fiber core wires 11 of the optical fiber ribbon 12 has higher degree of freedom, which may cause position shifting of the optical fiber core wires 11 (the glass fibers 11a) when butting the glass fibers 11a to each other (a section X in the drawing). Thus, the present embodiment is particularly effective for the intermittently bonded optical fiber ribbon in which the plurality of optical fiber core wires 11 are disposed side by side and bonded at intervals in the longitudinal direction.

Also, the disarrangement due to the side pressure is likely to occur often in a case with the optical fiber core wire 11 having the small outer diameter (the outer diameter of the resin coating 11b). Thus, the present embodiment is particularly effective in a case where each optical fiber core wire 11 forming the optical fiber tape has the outer diameter of 225 µm or less. It is further effective when the outer diameter of the optical fiber core wire is reduced to 200 µm or less, or even to 170 µm or less.

Moreover, the glass fiber 11a without the resin coating 11b traditionally has the outer diameter of 125 µm. However, if the glass fiber 11a is thinner, the rigidity of the optical fiber core wire 11 decreases, and this may cause the disarrangement of the glass fibers 11a due to the side pressure. Thus, the present embodiment is particularly effective in a case where the outer diameter of each of the glass fibers 11a forming the optical fiber tape is 110 µm or less.

Moreover, if the pitch P between the optical fiber core wires 11 is smaller than a traditional pitch of 250 µm, it is necessary to prevent the disarrangement of the optical fiber core wires 11 with certainty. Otherwise, issues such as the glass fibers 11a coming into contact with each other are likely to occur. Thus, the present embodiment is particularly effective in a case where the pitch P between the optical fiber core wires 11 is 225 µm or less. In particular, if the pitch P between the optical fiber core wires 11 is reduced to 200 µm or less, or even to 170 µm or less, the possibility of contact or intersection between the glass fibers 11a increases, and thus the present embodiment is furthermore effective.

Also, the more the number of the optical fiber core wires 11 forming the optical fiber tape is, the more likely the disarrangement of the optical fiber core wires 11 due to the side pressure occurs. Thus, the present embodiment is particularly effective in a case where the number of the plurality of optical fiber core wires 11 forming the optical fiber tape is 8 or more. The present embodiment is furthermore effective as the number of the optical fiber core wires is increased to 12 or more, 16 or more, or 24 or more.

That is, the present embodiment is remarkably effective for the intermittently bonded optical fiber ribbon having the large number of the optical fiber core wires 11, the small pitch P between the optical fiber core wires 11, and the small outer diameter of the optical fiber core wire 11.

As above, according to the first embodiment of the present invention, the thick portion 13 is formed at the substantially center portion of the width direction of the heat-meltable member 7. This makes the amount of the heat-meltable member at the center portion greater than the amount of the heat-meltable member on the end portion sides, and thus the flow of the heat-meltable member 7 when melted can disperse the optical fiber core wires 11 to the width direction. This can suppress the disarrangement of the optical fiber core wires 11 due to the side pressure and suppress a variation in transmission loss in each of the optical fiber core wires 11.

Also, the thick portion is formed in a shape protruding toward the inner surface side of the heat-meltable member 7. This allows the optical fiber core wires 11 to be arranged along the protruding shape of the thick portion 13. This protruding shape also allows the optical fiber core wires 11 to be dispersed to and arranged on the end portion sides of the width direction.

Figure 4:
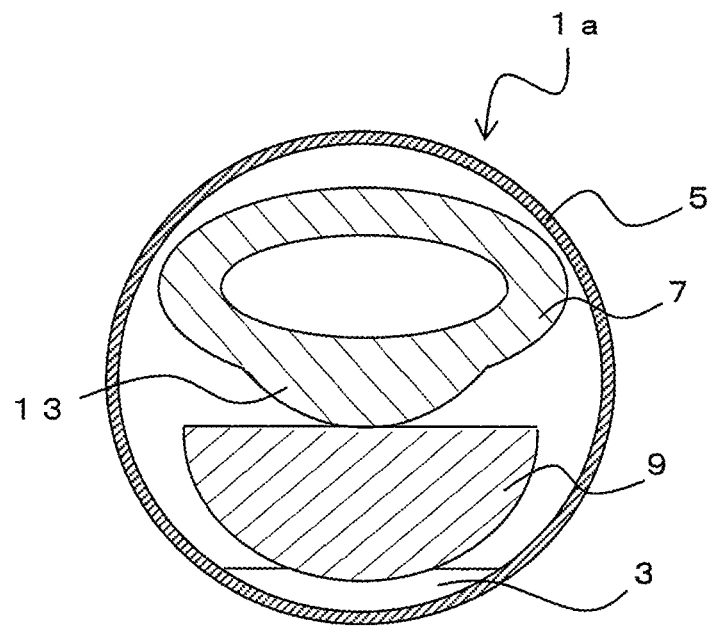
Figure 4:
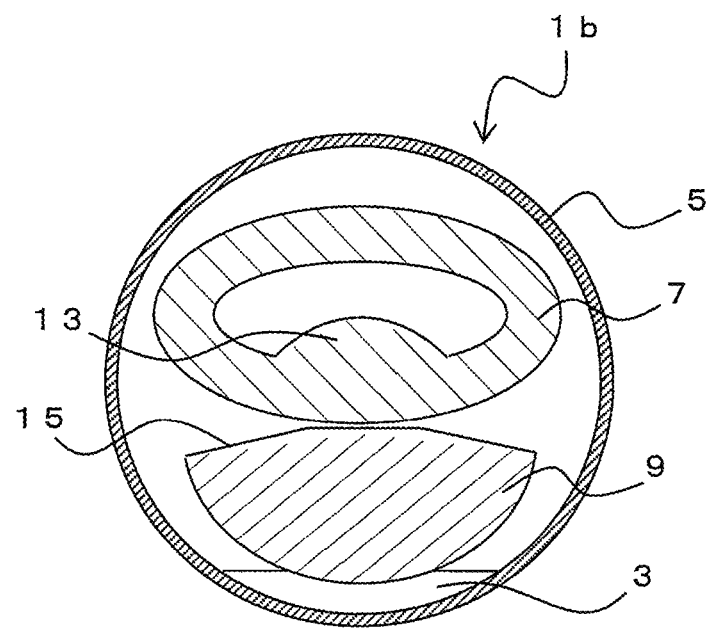

The shape of the thick portion 13 is not limited to the protruding shape protruding toward the inner surface side of the heat-meltable member 7. For example, the thick portion 13 may protrude toward an outer surface side of the heat-meltable member 7 (on a side of the tension member 9), as in a reinforcing sleeve 1a, shown in FIG. 4A. This can also make the amount of the heat-meltable member at the center portion greater than the amount of the heat-meltable member on the end portion sides, and thus the flow of the heat-meltable member 7 when melted can disperse the optical fiber core wires 11 to the width direction.

Furthermore, to make the heat-meltable member 7 flow in the width direction more efficiently, an upper surface of the tension member 9 (on a side of the heat-meltable member 7) may protrude toward a side of the heat-meltable member 7 as in a reinforcing sleeve 1b shown in FIG. 4B. By forming a slope surface, which gradually moves away from the heat-meltable member 7 as moving toward the end portion of the width direction, on the upper surface of the tension member 9, the heat-meltable member 7 can flow toward the end portion sides of the width direction more efficiently. Although linear slopes are formed in the example shown in the drawing, the slope may be a curved surface or may be linearly shaped.

Second Embodiment

Figure 5:
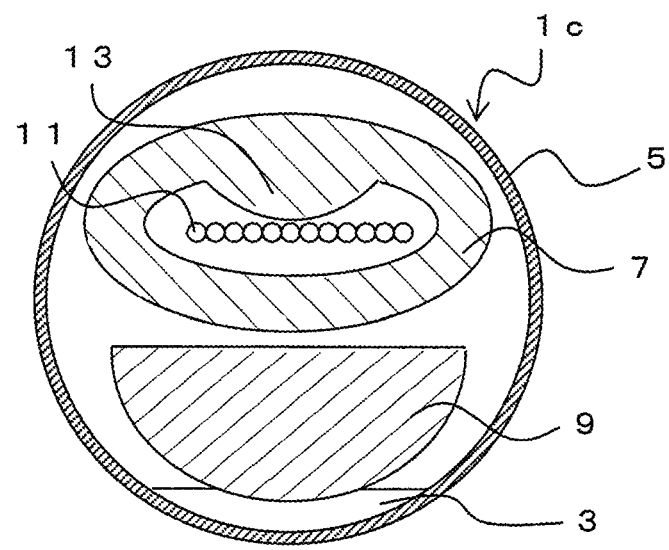
FIG. 5A is a cross-sectional view of a reinforcing sleeve 1c before shrinking.
FIG. 5B is a cross-sectional view of the reinforcing sleeve 1c in the course of shrinking.
Figure 5:
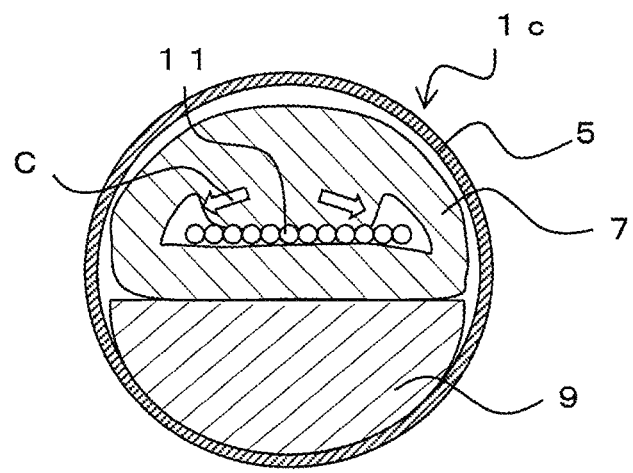

Next, a second embodiment of the present invention will be described. FIG. 5A is a cross-sectional view of a reinforcing sleeve 1c. In the descriptions hereafter, structures having the same functions as in the reinforcing sleeve 1, 1a, and 1b will have the same notations as in FIG. 1A to FIG. 4B, and redundant descriptions will be omitted.

The reinforcing sleeve 1c has approximately the same structure as the reinforcing sleeve 1 except that the heat-meltable member 7 is in a different shape. In the present embodiment, the thick portion 13 is disposed on an upper part of the heat-meltable member 7 (on a side opposite to the tension member 9). More particularly, the thick portion 13 is formed on the upper part of the heat-meltable member 7 in a shape protruding toward the inner surface side of the heat-meltable member 7. That is, a lower part of the heat-meltable member 7 (the side of the tension member 9) is in the same shape as traditional heat-meltable members.

FIG. 5B is a cross-sectional view showing a state in which the heat-shrinkable tube 5 starts shrinking and the heat-meltable member 7 starts melting. As mentioned above, the thick portion 13 is formed at the substantially center portion of the width direction of the heat-meltable member 7. When the heat-meltable member 7 softens and melts, the heat-meltable member 7 starts to flow from the upper part to the lower part. When the heat-meltable member 7 has flowed to the lower part to a certain extent, flows to the end portions of the width direction occur (arrows C in the drawing).

As above, forming the thick portion 13 on the opposite side of the tension member 9 can also make the amount of the heat-meltable member at proximity of the center portion of the width direction of the heat-meltable member 7 in a cross section perpendicular to the longitudinal direction of the heat-meltable member 7 greater than the amount of the heat-meltable member on proximity of the end portions of the width direction.

Figure 6:
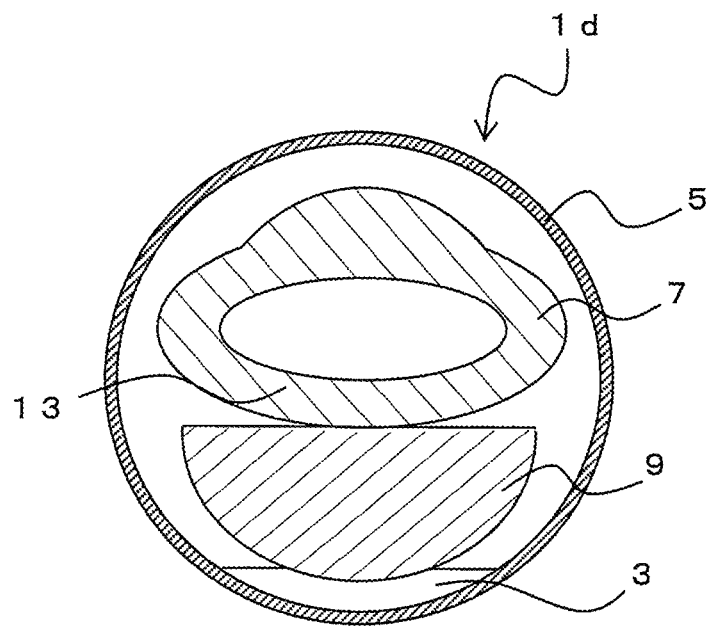
FIG. 6A is a cross-sectional view of a reinforcing sleeve 1d.
FIG. 6B is a cross-sectional view of a reinforcing sleeve 1e.
Figure 6:
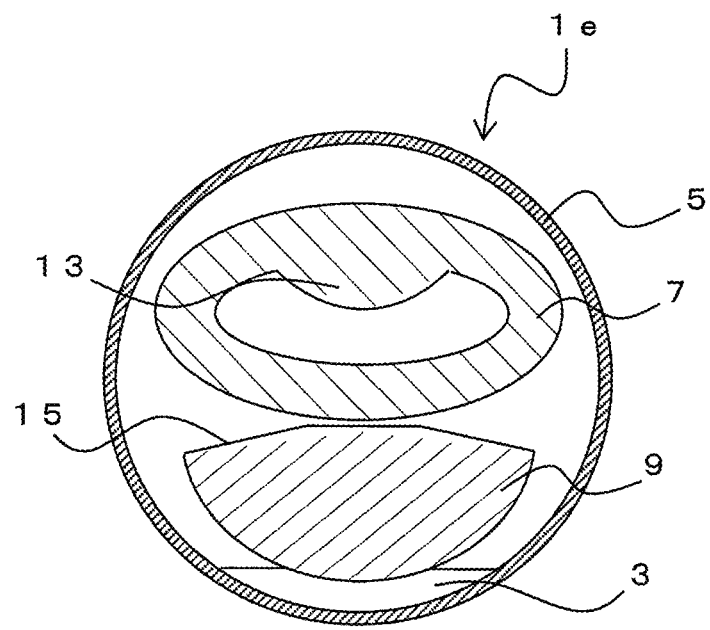

The thick portion 13 may be formed on the upper part of the heat-meltable member 7 (the opposite side of the tension member 9) in a shape protruding toward an outer surface side of the heat-meltable member 7 as in a reinforcing sleeve 1d shown in FIG. 6A. In addition, the upper surface side of the tension member 9 (the side of the heat-meltable member 7) may be in a shape protruding upward as in a reinforcing sleeve 1e shown in FIG. 6B.

According to the second embodiment of the present invention, the same effects as in the first embodiment can be obtained. As above, the thick portion 13 may be either on the lower part or on the upper part of the heat-meltable member 7.

Third Embodiment

Figure 7:
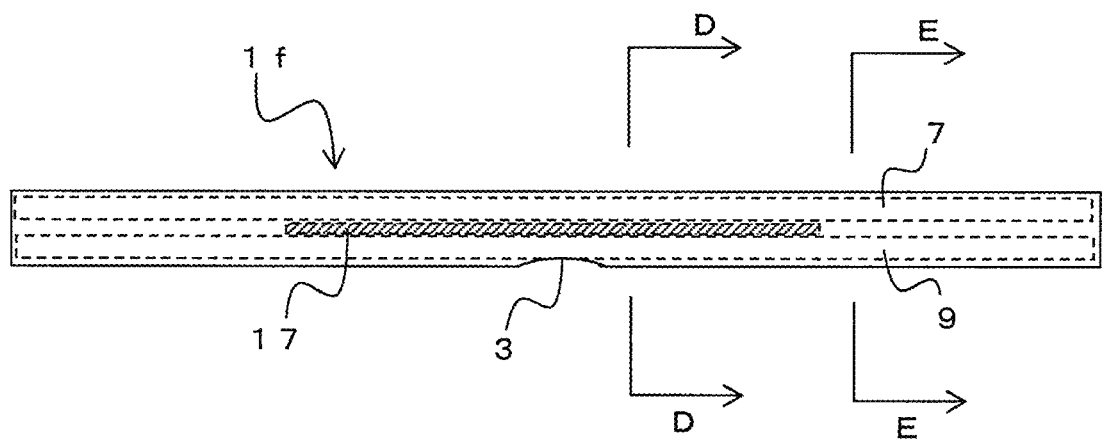
FIG. 7A is a side view of a reinforcing sleeve 1f.
FIG. 7B is a cross-sectional view taken along D-D line in FIG. 7A.
FIG. 7C is a cross-sectional view taken along E-E line in FIG. 7A.
Figure 7:
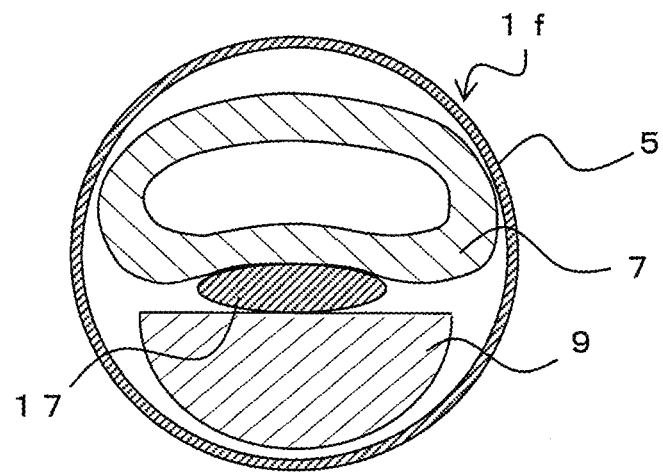
Figure 7:
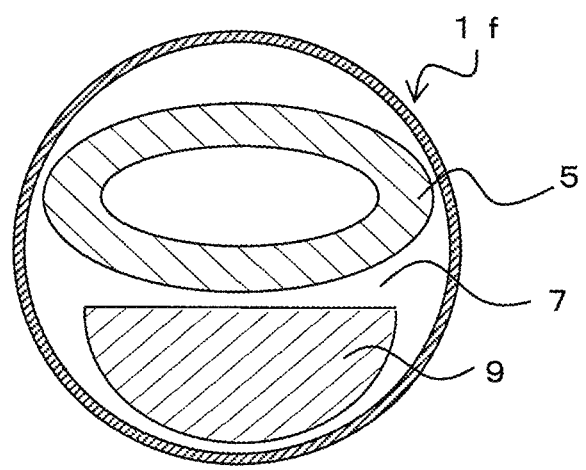

Next, a third embodiment will be described. FIG. 7A is a side view of a reinforcing sleeve 1f, FIG. 7B is a cross-sectional view taken along D-D line in FIG. 7A, and FIG. 7C is a cross-sectional view taken along E-E line in FIG. 7A. The reinforcing sleeve if has approximately the same structure as the reinforcing sleeve 1 except that both the heat-meltable member 7 and a heat-meltable member 17 are used.

In the present embodiment, the heat-meltable member includes the tube-shaped heat-meltable member 7, which is a first heat-meltable member, and the heat-meltable member 17, which is a second heat-meltable member disposed at the center portion of the width direction of the heat-meltable member 7.

The heat-meltable member 17 is disposed between the heat-meltable member 7 and the tension member 9. That is, the heat-meltable member 17 is disposed on the lower part of the heat-meltable member 7. Also, the heat-meltable member 17 is in a rod shape and is in an elliptical shape, for example. That is, an outer shape of the heat-meltable member 17 is formed to be protruding toward the heat-meltable member 7. Note that cross sectional shape of the heat-meltable member 17 is not particularly limited.

A width of the heat-meltable member 17 is smaller than a width of the heat-meltable member 7. With the heat-meltable member 17 being disposed at the substantially center portion of the width direction, it is also possible to make the amount of the heat-meltable member (sum of the heat-meltable member 7 and the heat-meltable member 17) at proximity of the center portion of the width direction of the heat-meltable member 7 in a cross section perpendicular to the longitudinal direction of the heat-meltable member 7 greater than the amount of the heat-meltable member (the heat-meltable member 7 only) on proximity of the end portions of the width direction.

The heat-meltable member 17 may be disposed over an entire length of the reinforcing sleeve 1f, or may be disposed only over a predetermined range at substantially center of a longitudinal direction of the reinforcing sleeve 1f. As mentioned above, the glass fibers are exposed at the spliced portion of the optical fiber core wires 11. At the exposed part of the glass fiber, a fiber diameter is small and the resin coating, which is a protective layer, is removed. Thus, the exposed part is likely to be affected by the side pressure.

Thus, with the heat-meltable member 17 disposed at a part corresponding to the exposed part of the glass fiber, the flow of the heat-meltable members 7 and 17 when melted, as mentioned above, can suppress the influence of the side pressure. Also, the amount of use of the heat-meltable members can be saved by not disposing the heat-meltable member 17 at proximity of end portions of the longitudinal direction of the reinforcing sleeve 1f, since such the portions have the resin coating and are less affected by the side pressure compared to the glass fiber exposed portion.

A position of the heat-meltable member 17 is not restricted to a position between the heat-meltable member 7 and the tension member 9. For example, the heat-meltable member 17 may be disposed inside the heat-meltable member 7 as in a reinforcing sleeve 1g shown in FIG. 8A. In such the case, the optical fiber core wires 11 may be disposed on an upper part of the heat-meltable member 17 or on a lower part of the heat-meltable member 17.

Figure 8:
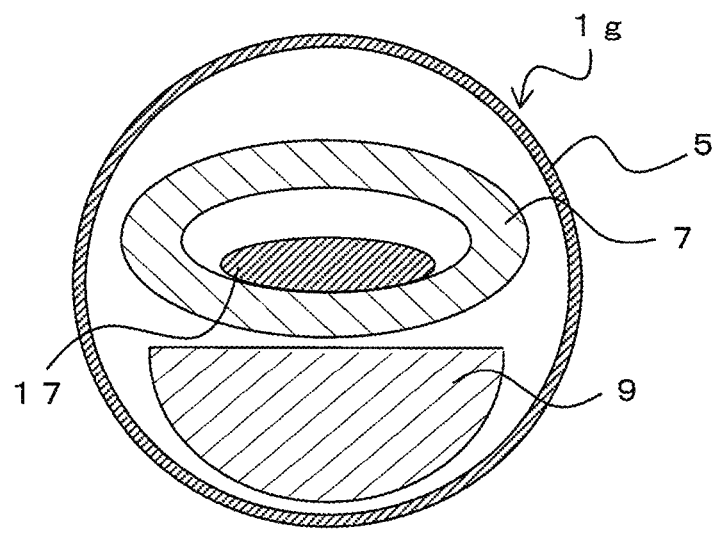
FIG. 8A is a cross-sectional view of a reinforcing sleeve 1g.
FIG. 8B is a cross-sectional view of a reinforcing sleeve 1h.
Figure 8:
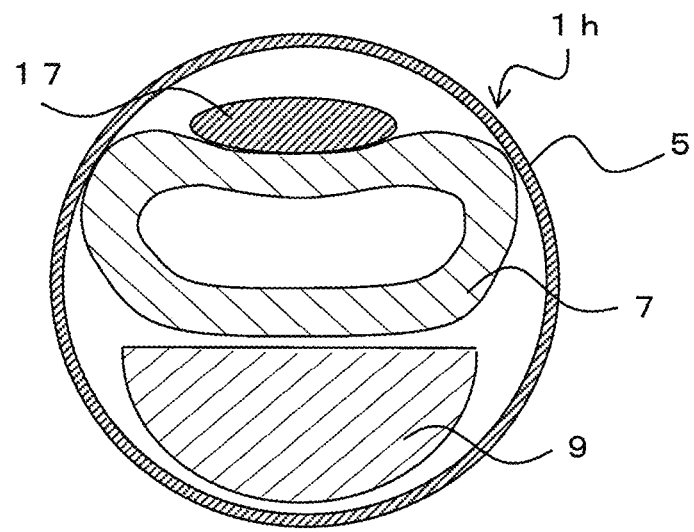

Alternatively, the heat-meltable member 17 may be disposed on the upper part of the heat-meltable member 7 (on the side opposite to the tension member 9) as in a reinforcing sleeve 1h shown in FIG. 8B. Furthermore, although drawings are omitted, the upper surface of the tension member 9 may be in a shape protruding toward the heat-meltable members 7 and 17 as mentioned above.

According to the third embodiment, the same effects as in the first embodiment can be obtained. As above, a plurality of the heat-meltable members 7 and 17 may be used to increase the amount of the heat-meltable member at the center portion of the width direction.

Fourth Embodiment

Figure 9:
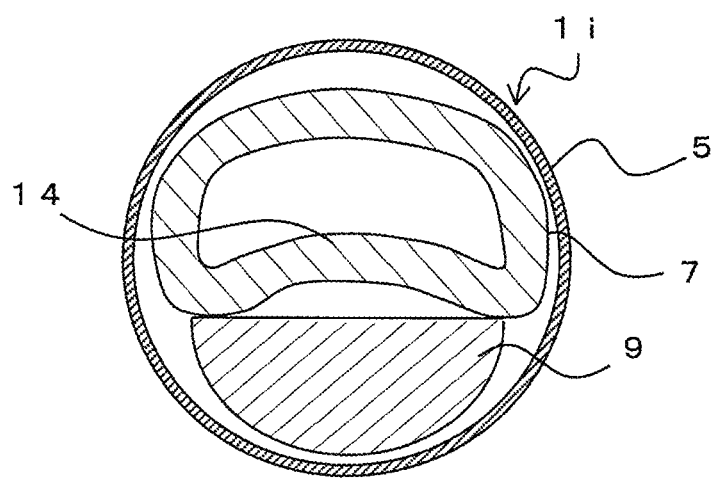
FIG. 9 is a cross-sectional view of a reinforcing sleeve 1i.

Next, a fourth embodiment will be described. FIG. 9 is a cross-sectional view of a reinforcing sleeve 1i. The reinforcing sleeve 1i has approximately the same structure as the reinforcing sleeve 1 except that, instead of forming the thick portion 13, the shape of the heat-meltable member 7 is altered. That is, although the tube-shaped heat-meltable member 7 has a substantially uniform thickness over an entire circumference, a convex portion 14 protruding toward an inner surface side is formed at proximity of a center portion of a width direction on the side of the tension member 9.

It is expected that molding the heat-meltable member 7 in advance to form the convex portion 14 protruding toward the inner surface side as above can provide the same effects as the reinforcing sleeve 1b, for example. In addition, as the convex portion 14 is formed, a concave portion is formed on an outer surface at the center of the width direction on the side of the tension member 9. This facilitates positioning of the heat-meltable member 7 in a rotational direction. Furthermore, when using the heat-meltable member 17 as in the reinforcing sleeve 1f, positioning of the heat-meltable member 17 is easy since the heat-meltable member 17 can be disposed to fit the concave portion that is formed in advance on the outer surface.

According to the fourth embodiment, the same effects as in the first embodiment can also be obtained. That is, the present invention is to have a structure in which the heat-meltable member can disperse the optical fiber core wires from proximity of the center portion toward proximity of the end portions of the width direction. For example, the convex portion 14 protruding toward the inner surface side may be provided by molding the inner surface shape at the proximity of the center of the width direction of the heat-meltable member 7 on the side of the tension member. Alternatively, a thick portion 8 having a thickness larger than the other parts may be formed at proximity of the center portion of the width direction of the heat-meltable member 7 so as to function as the convex portion 14. Further alternatively, the heat-meltable member 17, which is the second heat-meltable member, may be disposed at proximity of the substantially center of the width direction of the heat-meltable member 7 so as to function as the convex portion 14. Needless to say, structures in the each of the embodiments can be combined with each other.

Although the preferred embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

DESCRIPTION OF NOTATIONS 1, 1a, 1b, 1c, 1d, 1e, 1f, 1g, 1h, 1i . . . reinforcing sleeve
3 . . . rivet-head portion
5 . . . heat-shrinkable tube
7,17 . . . heat-meltable member
9 . . . tension member
11 . . . optical fiber core wire
11a . . . glass fiber
11b . . . resin coating
11c . . . bonding portion
12 . . . optical fiber ribbon
13 . . . thick portion
14 . . . convex portion
100 . . . reinforcing sleeve
101 . . . optical fiber core wire
103 . . . electrode
105 . . . heat-shrinkable tube
107 . . . heat-meltable member
109 . . . tension member

What is claimed is:

1. A reinforcing sleeve for collectively reinforcing spliced portions of a plurality of optical fiber core wires disposed side by side, the reinforcing sleeve comprising:
    a heat-shrinkable tube;
    a tension member; and
    a heat-meltable member, the tension member and the heat-meltable member being inserted into the heat-shrinkable tube, wherein
    the heat-meltable member includes a thick portion having a thickness that is greater than thicknesses of other portions of the heat-meltable member, the thick portion being formed at proximity of a center portion of a width direction in a cross section perpendicular to a longitudinal direction of the heat-meltable member.

2. The reinforcing sleeve according to claim 1, wherein the thick portion is formed on a side of the tension member of the heat-meltable member and an inner surface side of the heat-meltable member is formed in a protruding shape protruding toward a center of the heat-meltable member.

3. A reinforcing structure of a spliced portion of an optical fiber using the reinforcing sleeve according to claim 1, wherein the heat-meltable member unifies a spliced portion of optical fiber ribbons with the tension member as one body, each of the optical fiber ribbons including a plurality of optical fiber core wires that are placed side by side and bonded to each other at intervals in the longitudinal direction.

4. The reinforcing structure of the spliced portion of the optical fiber according to claim 3, wherein a number of the plurality of optical fiber core wires forming each of the optical fiber ribbons is 12 or more.

5. The reinforcing structure of the spliced portion of the optical fiber according to claim 3, wherein a pitch between the plurality of optical fiber core wires is 200 μm or less.

6. The reinforcing structure of the spliced portion of the optical fiber according to claim 3, wherein an outer diameter of a glass fiber of each of the plurality of optical fiber core wires is 110 μm or less.

7. The reinforcing structure of the spliced portion of the optical fiber according to claim 3, wherein an outer diameter of each of the plurality of optical fiber core wires is 200 μm or less.

* * * * *